United States Patent
Lee et al.

(10) Patent No.: US 7,742,666 B2
(45) Date of Patent: Jun. 22, 2010

(54) OPTICAL BEAM SPLITTER

(75) Inventors: Michael G. Lee, San Jose, CA (US);
Alexei L. Glebov, Santa Clara, CA (US);
Dashun S. Zhou, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/197,689

(22) Filed: Aug. 25, 2008

(65) Prior Publication Data

US 2010/0046890 A1    Feb. 25, 2010

(51) Int. Cl.
*G02B 6/26* (2006.01)
(52) U.S. Cl. .................. 385/45; 385/14; 385/129; 385/131; 385/132; 385/42
(58) Field of Classification Search .............. 385/45, 385/31, 14, 41, 42, 39, 43, 44, 46, 47, 129, 385/130, 131, 132
See application file for complete search history.

(56) References Cited

U.S. PATENT DOCUMENTS

| | | | | |
|---|---|---|---|---|
| 5,175,778 A | * | 12/1992 | Nourshargh et al. | 385/42 |
| 5,222,167 A | * | 6/1993 | Jean et al. | 385/45 |
| 5,343,545 A | * | 8/1994 | Ota et al. | 385/46 |
| 6,229,943 B1 | * | 5/2001 | Okayama | 385/39 |
| 6,243,516 B1 | * | 6/2001 | Seino | 385/47 |
| 6,968,104 B2 | * | 11/2005 | Zheng et al. | 385/45 |
| 7,302,137 B2 | * | 11/2007 | Doerr | 385/31 |
| 7,302,141 B2 | * | 11/2007 | Eldada | 385/45 |
| 2005/0185890 A1 | * | 8/2005 | Eldada | 385/45 |

* cited by examiner

*Primary Examiner*—Brian M Healy
(74) *Attorney, Agent, or Firm*—Baker Botts L.L.P.

(57) ABSTRACT

An optical beam splitter includes an input waveguide, two or more branching arms, two or more fan-out arms, and two or more output waveguides. The input waveguide receives an input light beam. The two or more branching arms are coupled to the input waveguide at a separation point and split the input light beam at the separation point into two or more light beams. Each fan-out arm is coupled to one of the branching arms and fans-out one of the two or more light beams to a predetermined output pitch. Each output waveguide is coupled to one of the fan-out arms and transmits one of the two or more light beams out of the optical beam splitter.

8 Claims, 3 Drawing Sheets

OPTICAL BEAM SPLITTER

TECHNICAL FIELD

This disclosure relates in general to optics and more particularly to an optical beam splitter.

BACKGROUND

The splitting of an optical beam into two or more optical beams is an important function in optical communication systems. Optical beam splitters enable a single optical beam from a source such as a laser to be supplied to more than one device. As a result, optical beam splitters are utilized in many devices including splitter arrays, optical interconnects, modulators, and the like.

Typical 1×2 optical splitters consist of an input waveguide, two fan-out arms coupled to the input waveguide at a separation point, and two output waveguides. An input light beam enters the optical splitter and travels through the input waveguide to the separation point. At the separation point, the light beam is split into two light beams by being forced to enter the two fan-out arms. The two light beams then travel through the fan-out arms and out of the optical splitter via the output waveguides.

Since light beams tend to travel in a straight line, and since the fan-out arms typically have a strong curvature at the separation point, a small amount of light from the center of the input light beam will not enter either fan-out arm. This results in a propagation loss in the input light beam and thus a decrease in the intensity of the two light beams exiting the optical splitter.

SUMMARY OF THE DISCLOSURE

The present disclosure provides an optical beam splitter that substantially eliminates or reduces at least some of the disadvantages and problems associated with previous methods and systems.

According to one embodiment, an optical beam splitter includes an input waveguide, two or more branching arms, two or more fan-out arms, and two or more output waveguides. The input waveguide receives an input light beam. The two or more branching arms are coupled to the input waveguide at a separation point and split the input light beam at the separation point into two or more light beams. Each fan-out arm is coupled to one of the branching arms and fans-out one of the two or more light beams to a predetermined output pitch. Each output waveguide is coupled to one of the fan-out arms and transmits one of the two or more light beams out of the optical beam splitter.

Technical advantages of certain embodiments may include providing efficient optical beam splitting resulting in a reduction of propagation loss. Other advantages may include a decrease in device size resulting in lower propagation loss and lower insertion loss. Embodiments may eliminate certain inefficiencies such as reducing or eliminating the excess loss of light associated with conventional optical splitters.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Figure 1A:
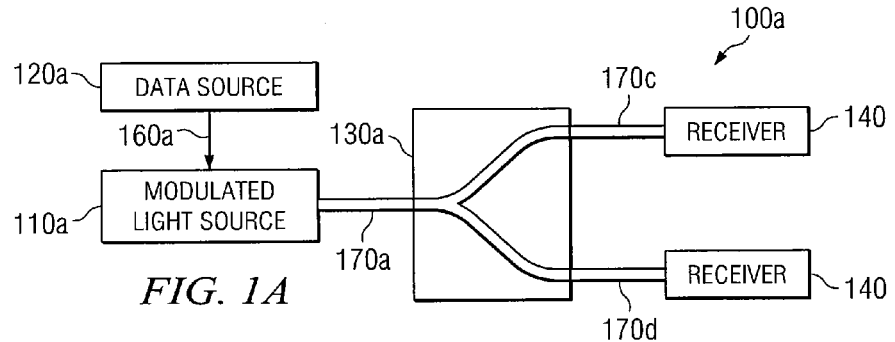
FIGS. 1A and 1B are simplified block diagrams illustrating optical systems where a particular embodiment of this disclosure may be utilized.
Figure 1B:
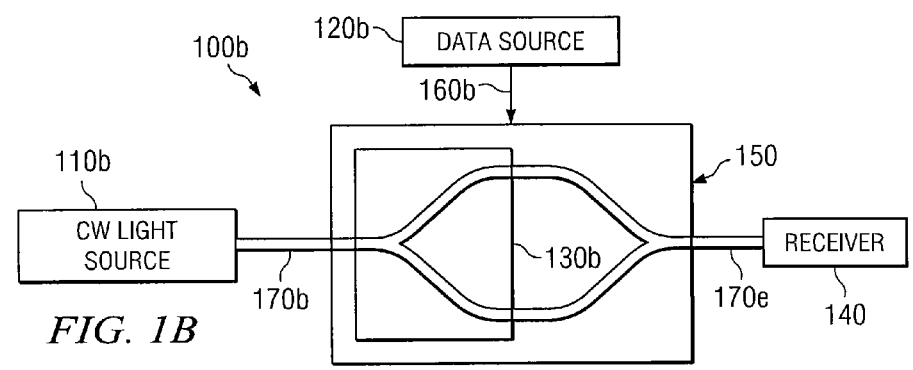

FIGS. 1A and 1B depict example optical systems 100a and 100b where a particular embodiment may be utilized. Optical systems 100 include a modulated light source 110a, a continuous wave light source 110b, data sources 120a and 120b, optical splitters 130a and 130b, one or more receiving devices 140, and a modulator 150. Light sources 110 typically consist of lasers or any other device that produces a light beam. Data source 120a is coupled to modulated light source 110a via electrical data link 160a, and data source 120b is coupled to modulator 150 via electrical data link 160b. Data sources 160 provide data to be modulated onto a light beam. Modulator 150 includes an optical splitter 130b and modulates data from data source 120b onto a continuous wave light beam received from continuous wave light source 110b. Light sources 110 are coupled to optical splitters 130 via optical links 170. Receiving devices 140 are also coupled to optical splitter 130a and modulator 150 via optical links 170. Optical links 170 include, but are not limited to, optical waveguides, such as rectangular waveguides, slab waveguides, optical fibers, and the like. Data sources 110 and receiving devices 140 may be integrated circuits ("IC"), or any other suitable device that transmits and/or receives data.

In operation, data source 110a outputs data to modulated light source 110a via electrical data link 160a. Modulated light source 110a receives this data and generates a modulated light beam that corresponds to the data received from data source 110a. This modulated light beam is then transmitted via optical link 170a to optical splitter 130a. Optical splitter 130a receives the modulated light beam and splits this single beam into two modulated light beams. Optical splitter 130a then transmits each of these two modulated light beams to a receiving device 140 via optical links 170c and 170d where they are received and interpreted.

Additionally or alternatively, data source 110b outputs data to modulator 150 via electrical data link 160b. Optical splitter 130b inside modulator 150 receives a continuous wave light beam from continuous wave light source 110b via optical link 170b and splits this single beam into two continuous wave light beams. Modulator 150 then recombines these two light beams into a single modulated light beam that corresponds to the data received from data source 110b. This modulated light beam is then transmitted via optical link 170e to a receiving device 140 where it is received and interpreted.

It should be noted that optical systems 100 are just a few of many examples of the use of optical splitters. It should also be noted that embodiments in this disclosure are not limited to the optical systems shown in FIGS. 1A and 1B. Embodiments of this disclosure can be implemented in any situation where light needs to be split.

Figure 2:
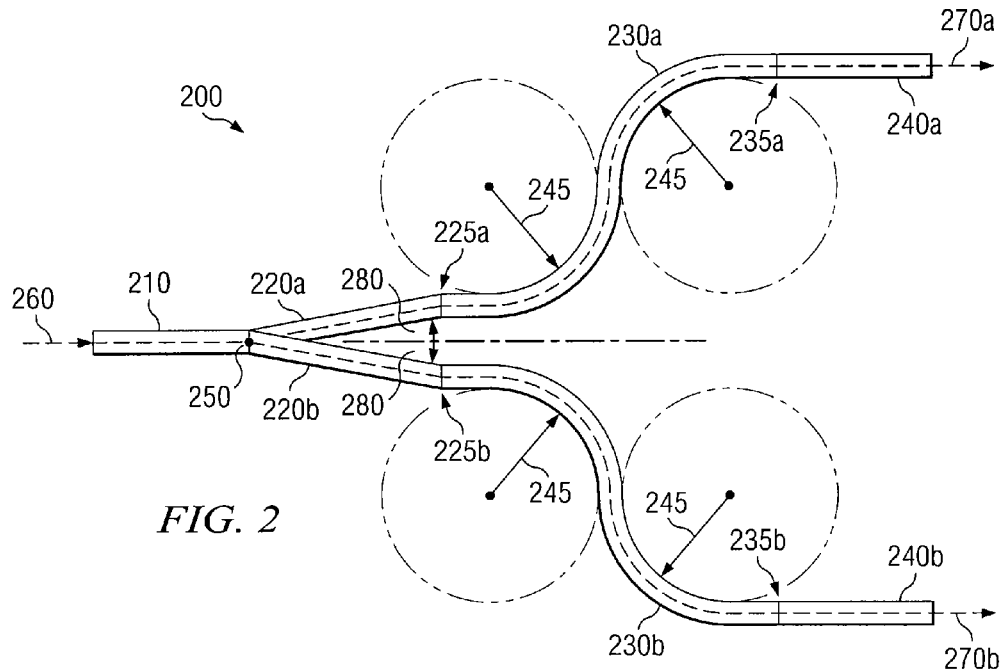
FIG. 2 illustrates an optical beam splitter in accordance with a particular embodiment of this disclosure.

FIG. 2 depicts an optical beam splitter 200 in accordance with a particular embodiment. Optical beam splitter 200 could be utilized as optical splitters 130, discussed above in connection with FIGS. 1A and 1B, or in any other suitable implementations where a light beam is to be split. Optical beam splitter 200 includes an input waveguide 210, branching arms 220, S-bend fan-out arms 230, and output waveguides 240. Input waveguide 210 is coupled to branching arms 220 at a separation point 250. Each branching arm 220 is coupled to an S-bend fan-out arm 230 at an interface 225. S-bend fan-out arms 230 are in turn coupled to output waveguides 240 at interfaces 235.

In operation, an input light beam 260 enters optical beam splitter 200 via input waveguide 210. Input light beam 260 travels through input waveguide 210 until it reaches separation point 250. At separation point 250, input light beam 260 is split into two light beams, light beams 270a and 270b, by being forced to enter branching arms 220. After traveling through branching arms 220, light beams 270 traverse S-bend fan-out arms 230 and then exit optical beam splitter 200 via output waveguides 240a and 240b.

Branching arms 220 enable optical beam splitter 200 to provide significant improvements over conventional optical splitter designs. In typical optical splitters, two S-bend fan-out arms are coupled directly to an input waveguide. Typical S-bend fan-out arms utilize two sharp bends having a bending radius (such as 10 mm) in order to reach a required output pitch (such as 125 μm or 250 μm) in a short distance. Because the fan-out arms are coupled directly to the input waveguide, they both (i) split the incoming light beam into two light beams and (ii) fan-out these two light beams to the required output pitch. By combining these functions in the two fan-out arms, however, typical optical splitters introduce a significant propagation loss to the incoming light beam. Optical beam splitter 200, however, separates the two functions of splitting the incoming light beam and fanning-out the resulting two light beams to the required output pitch. As a result, optical beam splitter 200 reduces the unwanted propagation loss associated with typical optical splitters.

To separate the two functions of splitting and fanning-out the light beams, optical beam splitter 200 first employs branching arms 220 to split input light beam 260 into light beams 270a and 270b. Branching arms 220 are slightly inclined with respect to input waveguide 210 and provide smooth ramps at separation point 250 for more efficient and clean splitting of input light beam 260 into light beams 270a and 270b. Optical beam splitter 200 then employs two S-bend fan-out arms 230 coupled to branching arms 220 to fan-out light beams 270a and 270b. S-bend fan-out arms 230 are similar to fan-out arms in conventional optical splitters and each have bends with a radius of curvature 245 to fan-out light beams 270a and 270b to the required output pitch. Unlike in conventional optical splitters, however, S-bend fan-out arms 230 do not perform the function of splitting the input light beam. This function is performed by branching arms 220 which offer a much cleaner and efficient splitting of input light beam 260 since they have small inclination angles 280 that are much less than S-bend fan-out arms in conventional optical splitters. By separating the two functions of splitting and fanning-out the light beams, optical beam splitter 200 provides a significant reduction in propagation loss over conventional splitter designs.

As previously noted, branching arms 220 are slightly inclined (have small inclination angles 280) with respect to input waveguide 210 in order to provide smooth ramps and cleanly split input light beam 260 into light beams 270a and 270b. As an example only, and not by way of limitation, branching arms 220 may be 0.5 mm in length and/or may have inclination angle 280 of 0.5 degrees with respect to input waveguide 210. Additionally or alternatively, branching arms 220 may have various suitable geometries and dimensions, such as those seen in FIGS. 3A-3C. Branching arms 220 may be straight (FIG. 3A), concave (FIG. 3B), inflective (FIG. 3C), or any other geometric design that provides smooth ramps in order to cleanly and efficiently split input light beam 260 into light beams 270a and 270b.

Optical beam splitter 200 may be constructed with any typical waveguide construction technique including, but not limited to, photo exposure and/or photolithography. Optical beam splitter 200 may consist of three layers: a lower cladding layer, a core layer, and an upper cladding layer. Light travels through the core layer of optical beam splitter 200 which may be constructed of polysiloxane or any other material that allows light to propagate. Such a core layer may be fabricated such that it has the configurations shown in any of FIGS. 2-4, or any other suitable geometry and/or dimensions. Also, note that various segments are not necessarily formed separately and will often be formed together during fabrication (i.e. one mask may be used to fabricate the entire splitter.)

While the embodiments in FIGS. 1A, 1B, and 2 have been described in detail, numerous changes, substitutions, variations, alterations, and modifications may be ascertained by those skilled in the art. For example, FIGS. 1A, 1B and 2 depict an input light beam being split into two light beams. In other embodiments, however, the input light beam may be split into more than two light beams. Similarly, FIG. 2 shows two branching arms 220, two S-bend fan-out arms 230, and two output waveguides 240. In other embodiments, there may be more than two of each of these objects. It is intended that the present disclosure encompass all such changes, substitutions, variations, alterations and modifications as falling within the spirit and scope of the appended claims.

Figure 3A:
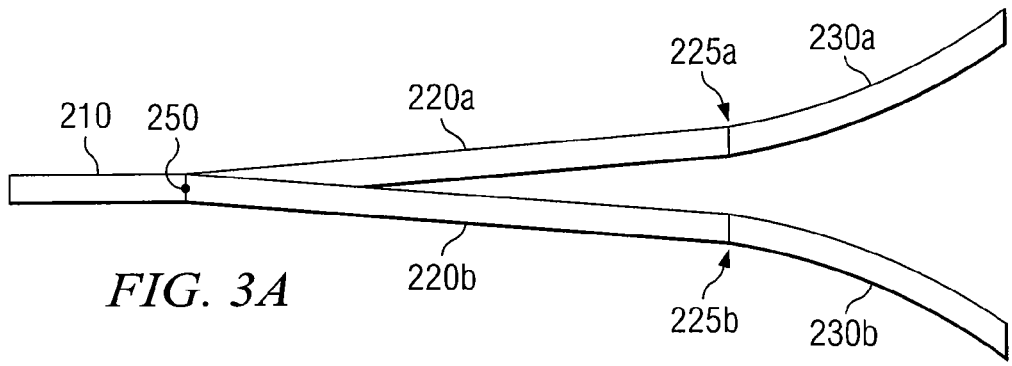
FIGS. 3A-3C illustrate geometric designs of an optical beam splitter in accordance with a particular embodiment of this disclosure.
Figure 3B:
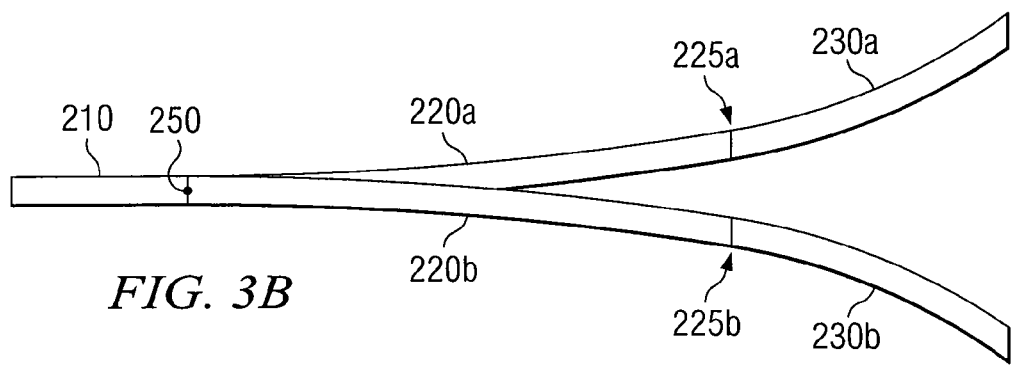
Figure 3C:
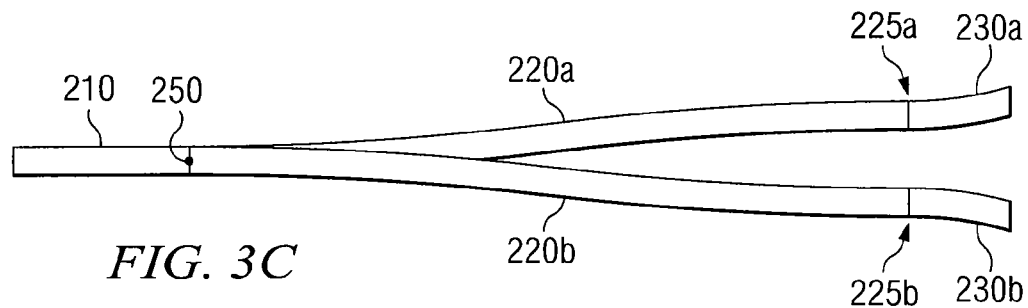
Figure 4:
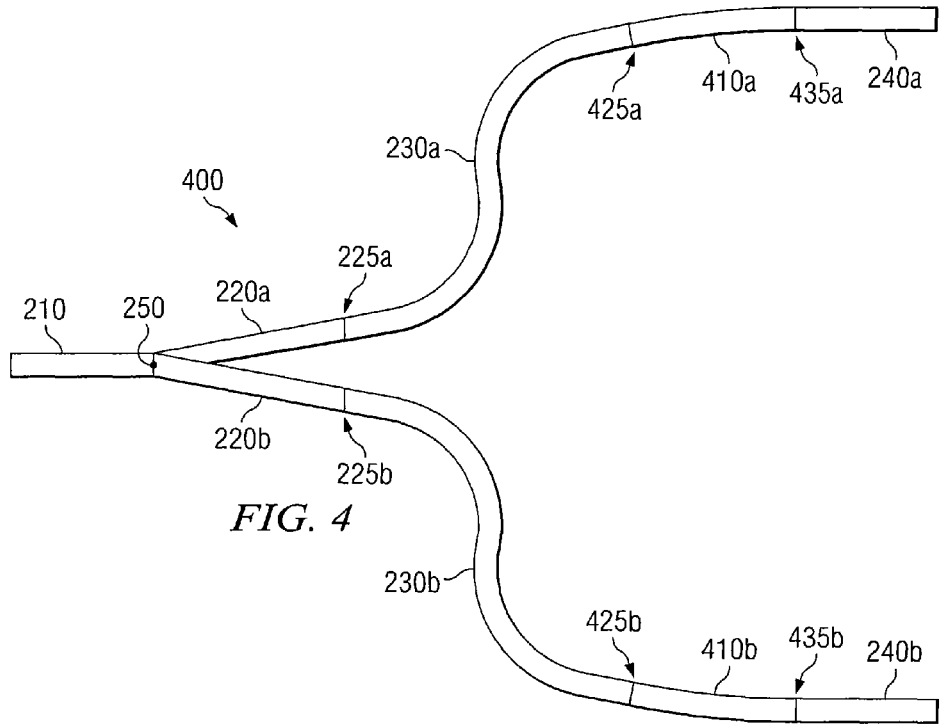
FIG. 4 illustrates an optical beam splitter in accordance with another particular embodiment of this disclosure.

FIG. 4 depicts another embodiment of an optical beam splitter in accordance with a particular embodiment. Optical beam splitter 400 is similar to optical beam splitter 200, but with modifications to further increase its efficiency and reduce propagation loss. As previously noted, branching arms 220 may be of different geometries including those shown in FIGS. 3A-3C. When branching arms 220 are straight as shown in FIGS. 2 and 3A, they may not have absolutely smooth connections to S-bend fan-out arms 230 at interfaces 225. (Note that interfaces 225 in FIG. 2 are exaggerated for purposes of illustration.) This may generate a small amount of loss in the optical signal passing through interfaces 225. To reduce or eliminate any loss associated with interface 225, optical beam splitter 400 provides S-bend fan-out arms 230 that are slightly rotated in order to provide an optical connection on the same tangent. As shown in FIG. 4, S-bend fan-out arm 230a is rotated slightly counter-clockwise, and S-bend fan-out arm 230b is rotated slightly clockwise from S-bend fan-out arms 230 in FIG. 2. This creates a smooth connection at interfaces 225 between S-bend fan-out arms 230 and branching arms 220, which reduces any optical signal loss associated with this interface.

When S-bend fan-out arms 230 are rotated as described above, interfaces 235 between S-bend fan-out arms 230 and output waveguides 240 then become disjoined. To correct this interface, optical beam splitter 400 further provides bridging segments 410 between S-bend fan-out arms 230 and output waveguides 240. Bridging segments 410 are of a shape such as that shown in FIG. 4 and are operable to smoothly couple S-bend fan-out arms 230 and output waveguides 240. For example, bridging segments 410 may be an arc that is on the same tangent with S-bend fan-out arms 230 on one end (interfaces 425), and is flat on the other end towards output waveguides 240 (interfaces 435). The result is the elimination of the disjoined interface between S-bend fan-out arms 230 and output waveguides 240. This, along with the improvement of the interface between S-bend fan-out arms 230 and branching arms 220, further reduces the optical signal loss from conventional optical splitters.

Optical beam splitters 200 and 400 can provide a significant reduction in optical signal propagation loss over conventional optical splitter designs. For example, in a conventional splitter that utilizes S-bend fan-out arms having 10 mm curves, the propagation loss of the splitter is typically around 0.7 dB. However, optical beam splitter 200 having similar S-bend fan-out arms (S-bend fan-out arms 230 with radius of curvature 245 of 10 mm) will have a greatly reduced propagation loss of around 0.2 dB. In addition, when optical beam splitter 400 is utilized, the propagation loss is further reduced to around 0.05 dB.

Additionally, optical beam splitters 200 and 400 can provide a significant reduction in space compared to conventional optical splitters that have similar optical signal propagation losses. For example, optical beam splitter 200 that utilizes S-bend fan-out arms 230 with radius of curvature 245 of 10 mm has a similar propagation loss as that of a conventional splitter that utilizes S-bend fan-out arms with 50 mm curves (that does not implement branching arms). Similarly, optical beam splitter 400 that utilizes S-bend fan-out arms 230 with radius 245 of 10 mm has a similar propagation loss as that of a conventional splitter that utilizes S-bend fan-out arms with 150 mm curves (that does not implement branching arms or bridging segments). Overall, optical beam splitters 200 and 400 offer similar propagation losses in less space than conventional splitters with much larger S-bend fan-out arms (or less propagation loss in the same space, or a combination of both). This reduction in size results in lower propagation loss and insertion loss over conventional optical splitters.

While particular embodiments have been described in detail, numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

Figure 5:
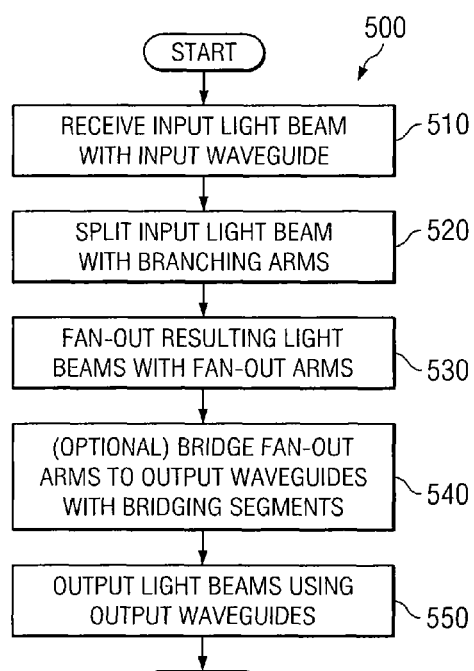
FIG. 5 illustrates an optical beam splitting method in accordance with a particular embodiment of this disclosure.

With reference now to FIG. 5, an example optical beam splitting method 500 is provided. Optical beam splitting method 500 begins in step 510 where an input light beam is received via an input waveguide. The input light beam may be received from a laser or any other device that produces a light beam. In step 520, the input light beam is split into two or more light beams via branching arms that are coupled to the input waveguide. The branching arms are slightly inclined with respect to the input waveguide to provide clean division of the input light beam similarly to branching arms 220 described above. In step 530, the light beams that were generated from the splitting of the input light beam in step 520 are fanned-out to a predetermined pitch with fan-out arms similar to S-bend fan-out arms 230 described above. In step 540, bridging segments similar to bridging segments 410 described above may optionally be implemented to bridge the fan-out arms to output waveguides. In step 550, output waveguides are implemented to output the light beams that were generated from the splitting of the input light beam in step 520.

While a particular optical beam splitting method 500 has been described, it should be noted that certain steps may be rearranged, modified, or eliminated where appropriate. Additionally, while certain embodiments have been described in detail, numerous changes, substitutions, variations, alterations and modifications may be ascertained by those skilled in the art, and it is intended that the present disclosure encompass all such changes, substitutions, variations, alterations and modifications as falling within the spirit and scope of the appended claims.

What is claimed is:

1. An optical beam splitter comprising:
    an input waveguide configured to receive an input light beam;
    two or more branching arms coupled to the input waveguide at a separation point, the branching arms configured to split the input light beam at the separation point into two or more light beams, each branching arm having a straight geometry, the branching arms being inclined with respect to the input waveguide, the two or more branching arms having a length of approximately 0.5 mm;
    two or more fan-out arms, each of the fan-out arms coupled to one of the branching arms and configured to fan-out one of the two or more light beams to a predetermined output pitch; and
    two or more output waveguides, each of the output waveguides coupled to one of the fan-out arms and configured to transmit one of the two or more light beams out of the optical beam splitter.

2. The optical beam splitter of claim 1, the two or more branching arms having an inclination angle with respect to the input waveguide of approximately 0.5 degrees.

3. An optical beam splitter comprising:
    an input waveguide configured to receive an input light beam;
    two or more branching arms coupled to the input waveguide at a separation point, the branching arms configured to split the input light beam at the separation point into two or more light beams, each branching arm having a straight geometry, the branching arms being inclined with respect to the input waveguide, the two or more branching arms having a length of approximately 0.5 mm;
    two or more fan-out arms, each of the fan-out arms coupled to one of the branching arms and configured to fan-out one of the two or more light beams to a predetermined output pitch;
    two or more bridging segments, each of the bridging segments coupled to one of the fan-out arms; and
    two or more output waveguides, each of the output waveguides coupled to one of the bridging segments and configured to transmit one of the two or more light beams out of the optical beam splitter.

4. The optical beam splitter of claim 3, the two or more branching arms having an inclination angle with respect to the input waveguide of approximately 0.5 degrees.

5. A method of splitting an optical beam comprising:
    receiving an input light beam using an input waveguide;
    splitting the input light beam into two or more light beams using two or more branching arms having a straight geometry coupled to the input waveguide at a separation point, the branching arms being inclined with respect to the input waveguide, the two or more branching arms having a length of approximately 0.5 mm; and fanning-out each of the two or more light beams to a predetermined output pitch using two or more fan-out arms.

6. The method of splitting an optical beam of claim 5 further comprising bridging each light beam from each fan-out arm to an output waveguide using a bridging segment.

7. An optical beam splitter comprising:
a means for receiving an input light beam;
a means having a straight geometry for splitting the input light beam into two or more light beams, the means for splitting the input light beam being inclined with respect to the means for receiving an input light beam, the means for splitting the input light beam having a length of approximately 0.5 mm; and a means for fanning-out each of the two or more light beams to a predetermined output pitch.

8. The optical beam splitter of claim 7 further comprising a means for bridging each light beam from the means for fanning-out each of the two or more light beams to an output waveguide.

\* \* \* \* \*